Nov. 4, 1947.  C. N. EVANS, JR  2,430,007

LOADING BIN ATTACHMENT FOR CORN PICKERS

Filed May 18, 1945

Inventor
Charles N. Evans, Jr.

Attorneys

Patented Nov. 4, 1947

2,430,007

UNITED STATES PATENT OFFICE 2,430,007

LOADING BIN ATTACHMENT FOR CORN PICKERS

Charles N. Evans, Jr., Haxtun, Colo.

Application May 18, 1945, Serial No. 594,442

3 Claims. (Cl. 214—65)

The present invention relates to new and useful improvements in corn pickers, and more particularly to a wheel-supported loading bin attached at one side of the picker and into which the husked ears of corn may be deposited by the usual elevator extending laterally from one side of the picker.

An important object of the present invention is to provide a frame for supporting the bin in an elevated position under the discharge end of the elevator and mounting the frame on a pair of longitudinally aligned wheels at the outer edge of the frame for traveling parallel to the picker and connecting the inner edge of the frame to the picker, whereby to eliminate the use of a wagon for receiving the husked corn and which is usually attached to and drawn by the machine.

A further object of the invention is to provide a bin attachment for corn pickers of this character of simple and practical construction, which is strong and durable, relatively inexpensive to manufacture, easy to install in operative position at one side of the picker without necessitating any material changes or alterations in the construction thereof, and which otherwise is well adapted for the purposes for which the same is intended.

Other objects and advantages reside in the details of construction and operation as more fully hereinafter described and claimed, reference being had to the accompanying drawing forming part hereof, wherein like numerals refer to like parts throughout, and in which:

Figure 1:
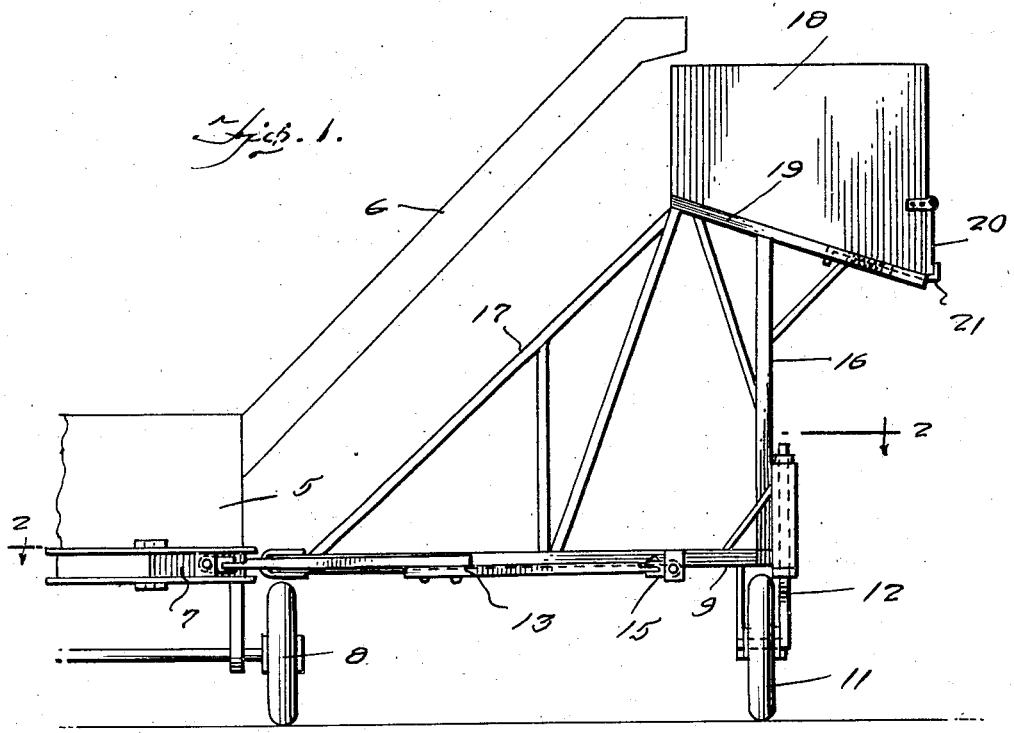
Figure 1 is a fragmentary front elevational view of the picker showing the bin attached to one side thereof.
Figure 2:
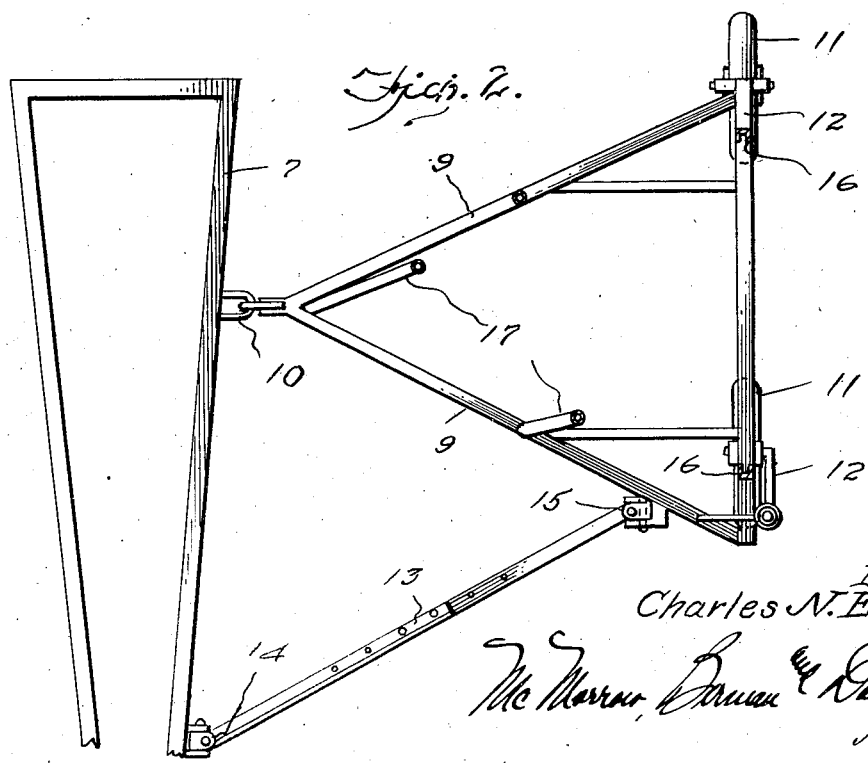
Figure 2 is a sectional view taken substantially on a line 2—2 of Figure 1.

Referring now to the drawing in detail, wherein for the purpose of illustration I have disclosed a preferred embodiment of the invention, the numeral 5 designates a corn picker of conventional construction and which includes an elevator 6 extending upwardly and outwardly at one side of the picker.

The picker also includes a frame 7 supported on wheels 8 for traveling over the field of corn along the rows thereof.

A substantially triangular-shaped bin-supporting frame 9 is positioned at one side of the picker, the frame 9 being attached at one corner to the frame 7 by means of loosely interconnected loops 10 to permit free vertical movement of the frame 9 relative to the picker when moving over uneven ground.

To the outer corners of the frame 9 are attached a pair of wheels 11, the wheels being arranged in longitudinal alignment and adapted to travel parallel to the wheels 8 of the picker. The wheels 11 are journaled in swivel mountings 12 to permit free turning of the wheels during the turning of the picker.

An extensible brace 13 is connected at its ends by means of universal joints 14 and 15 to the front portion of the picker frame 7 and also to the outer portion of the frame 9, at the front edge thereof.

The outer portion of the frame 9 is provided with upstanding supports 16 to which braces 17 are attached for supporting a bin 18 at the upper ends of the posts.

The bin 18 is formed with an outwardly sloping bottom 19 and to the outer side wall of the bin is attached a hinged door 20 secured in a closed position by means of a spring-retracted catch 21.

In the operation of the device, the corn gathered by the picker 5 is deposited in the bin 18 by the elevator 6 of the picker and after the bin has been filled, the corn may be deposited into a wagon or other storage position under the door 20.

It will be apparent that the frame 9 may be easily and quickly attached to one side of the picker frame 7 for movement over the ground together with the picker.

In view of the foregoing description taken in conjunction with the accompanying drawing, it is believed that a clear understanding of the construction, operation and advantages of the device will be quite apparent to those skilled in the art. A more detailed description is accordingly deemed unnecessary.

It is to be understood, however, that even though I have herein shown and described a preferred embodiment of my invention, the same is susceptible to certain changes fully comprehended by the spirit of the invention as herein described and the scope of the appended claims.

Having thus described the invention, what I claim is:

1. An attachment for corn pickers comprising a frame forming a horizontal triangle, positioned at one side of the picker, means pivotally connecting the adjacent apex of the frame to the picker for vertical and horizontal movement of the frame independently of the picker, a brace extending outwardly from the picker and connected to the front edge of the frame, wheels supporting the outer side of the frame for traveling parallel with the picker, and a bin supported in an elevated position on the frame for receiving corn from the picker.

2. An attachment for corn pickers comprising a frame forming a horizontal triangle, positioned at one side of the picker, link means pivotally connecting the adjacent apex of the frame to the picker for vertical and horizontal movement of the frame independently of the picker, an extensible brace universally connected to the picker and extending outwardly therefrom and universally connected to the front edge of the frame, wheels supporting the outer edge of the frame for traveling parallel with the picker, upstanding members carried by the frame, and a bin supported on the upper ends of said upstanding members for mounting in an elevated position on the frame to receive corn from the picker.

3. An attachment for corn pickers comprising a frame forming a horizontal triangle positioned at one side of the picker, link means pivotally connecting the adjacent apex of the frame to the picker for vertical and horizontal movement of the frame independently of the picker, an extensible brace universally connected to the picker and extending outwardly therefrom and universally connected to the front side of the frame, caster wheels each supporting an end of the outer side of the frame in tandem arrangement for traveling along a predetermined path with the picker, upstanding members carried by the frame, and a bin supported on the upper ends of said members and extending to either side of the vertical plane passing through the outer side of the frame.

CHARLES N. EVANS, Jr.

REFERENCES CITED

The following references are of record in the file of this patent:

UNITED STATES PATENTS

| Number | Name | Date |
|---|---|---|
| 1,501,974 | Stocking | July 22, 1924 |
| 1,555,760 | Roy | Sept. 29, 1925 |
| 1,569,432 | MacGregor | Jan. 12, 1926 |